United States Patent
Muto

(10) Patent No.: US 6,843,507 B2
(45) Date of Patent: Jan. 18, 2005

(54) TUBE JOINT

(75) Inventor: Masaaki Muto, Kashiwa (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/323,781

(22) Filed: Dec. 20, 2002

(65) Prior Publication Data

US 2003/0122372 A1 Jul. 3, 2003

(30) Foreign Application Priority Data

Dec. 28, 2001 (JP) ........................................ 2001-399485

(51) Int. Cl.[7] .............................................. F16L 37/00
(52) U.S. Cl. ........................ 285/39; 285/322; 285/323
(58) Field of Search ........................... 285/39, 322, 323

(56) References Cited

U.S. PATENT DOCUMENTS

| | | | | |
|---|---|---|---|---|
| 3,743,326 A | * | 7/1973 | Courtot et al. | 285/105 |
| 4,240,651 A | * | 12/1980 | Mariaulle | 285/39 |
| 4,304,426 A | * | 12/1981 | Francis | 285/323 |
| 4,431,216 A | * | 2/1984 | Legris | 285/104 |
| 5,160,179 A | * | 11/1992 | Takagi | 285/340 |
| 5,205,594 A | * | 4/1993 | Stoll et al. | 285/322 |
| 5,580,100 A | * | 12/1996 | Umezawa et al. | 285/39 |
| 5,580,105 A | * | 12/1996 | Miller et al. | 285/322 |
| 5,683,120 A | * | 11/1997 | Brock et al. | 285/148.21 |
| 5,722,696 A | * | 3/1998 | Taneya | 285/39 |
| 5,738,387 A | * | 4/1998 | Guest | 285/322 |
| 5,758,905 A | * | 6/1998 | Hama et al. | 285/38 |

FOREIGN PATENT DOCUMENTS

DE           39 23 579           1/1990

* cited by examiner

Primary Examiner—Eric K. Nicholson
(74) Attorney, Agent, or Firm—Paul A. Guss

(57) ABSTRACT

A tube joint includes a body into which a fluid tube is inserted, a chuck which is arranged in the body and which engages with an outer circumferential surface of the fluid tube to retain the fluid tube, fastening pawls which are disposed on an inner circumference of the chuck facing the fluid tube and which protrude while being inclined by predetermined angles, curved sections which are depressed by predetermined lengths in a direction in which the fluid tube is pulled, recesses which are formed in the curved sections, and a release bush which releases the fluid tube.

12 Claims, 15 Drawing Sheets

TUBE JOINT

BACKGROUND OF THE INVENTION

1. Field of the Invention

The present invention relates to a tube joint for connecting, for example, a fluid tube for introducing or discharging a fluid.

2. Description of the Related Art

A tube joint has been hitherto used to connect a fluid tube to a fluid pressure-operated apparatus such as a cylinder. Such a tube joint has a body into which the fluid tube is inserted. The body is provided with a fastening pawl which protrudes by a predetermined length radially inwardly. When the fluid tube is slightly pulled in a direction opposite to the insertion direction after inserting the fluid tube, then the end of the fastening pawl bites into the outer circumferential surface of the fluid tube, and thus the fluid tube is prevented from disengagement from the body. The fastening pawl is retained by an engaging member attached to the body.

In the conventional tube joint as described above, for example, if it is intended to increase strength for preventing the fluid tube from disengagement from the body (referred to as pull-out strength), the biting amount of the fastening pawl into the outer circumferential surface of the fluid tube is excessively increased. As a result, the fluid tube may be cut off by the fastening pawl. On the other hand, if it is intended to limit the biting amount of the fastening pawl into the outer circumferential surface of the fluid tube, the pull-out strength is decreased, and the fluid tube may be disengaged from the body.

SUMMARY OF THE INVENTION

A general object of the present invention is to provide a tube joint which makes it possible to improve the pull-out strength for preventing a fluid tube from disengagement from a body while limiting the biting amount of a fastening pawl so that the pull-out strength may be balanced with the biting amount of the fastening pawl.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
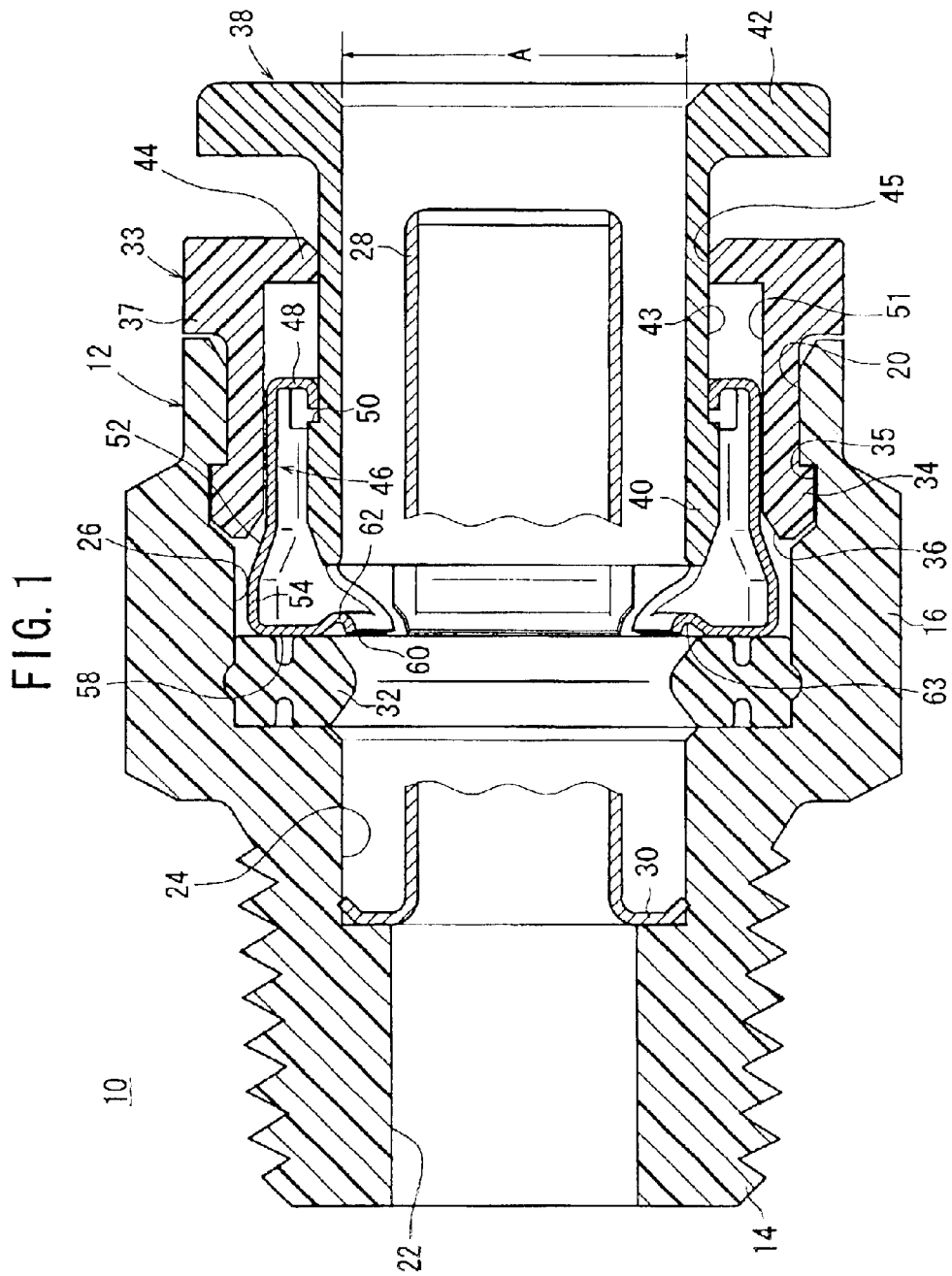
FIG. 1 is a longitudinal sectional view taken in an axial direction of a tube joint according to a first embodiment of the present invention.
Figure 2:
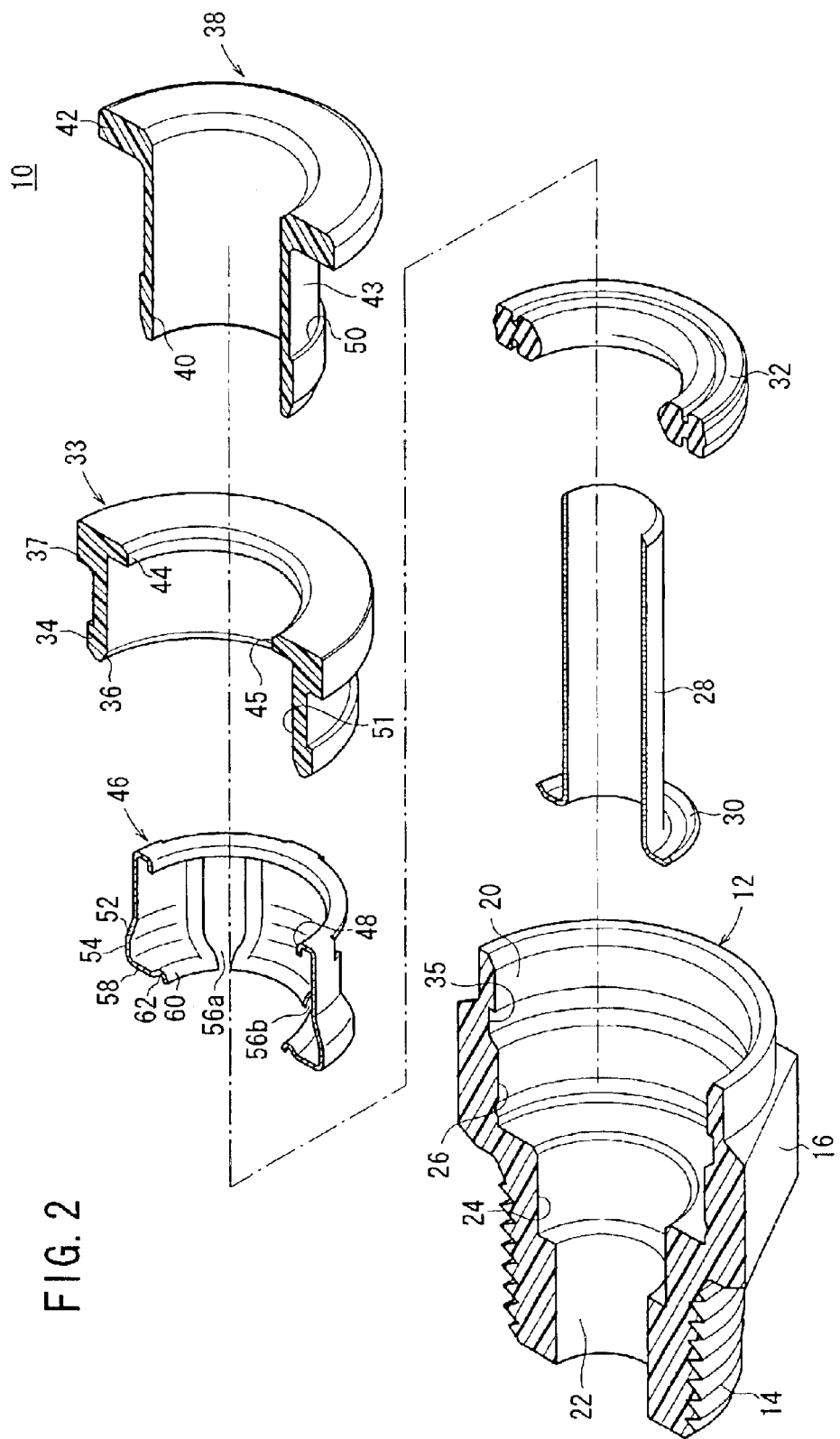
FIG. 2 is a longitudinal sectional exploded perspective view illustrating the tube joint.

In FIG. 1, reference numeral 10 indicates a tube joint according to a first embodiment of the present invention. The tube joint 10 has a substantially cylindrical body 12 made of a resin material. A connecting section 14 is formed at one end of the body 12, and is engraved with a screw portion to be screwed with a port of an unillustrated fluid-operated apparatus. A tightening section 16 having a hexagonal cylindrical cross section is provided at a substantially central portion of the outer circumferential surface in the axial direction of the body 12. An opening 20 is formed at the other end of the body 12. A fluid tube 18 (see FIGS. 8 to 13) made of a resin material is inserted into the opening 20.

A passage 22 is formed in the body 12, and penetrates through the body 12 from the one end to the other end. A first step section 24 and a second step section 26 are formed in this order from the connecting section 14 in the passage 22. A sleeve 28 having a substantially cylindrical shape has a flange section 30 which is engaged with the first step section 24. Accordingly, the sleeve 28 is prevented from disengagement from the body 12. The sleeve 28 functions to guide the fluid tube 18 when the fluid tube 18 (see FIGS. 8 to 13) is inserted and when the fluid tube 18 is disengaged.

A packing 32 is attached to the second step section 26 which is diametrally expanded as compared with the first step section 24, and protrudes inwardly by a predetermined length. The packing 32 is engaged with an annular groove of the second step section 26, and is positioned in the axial direction of the body 12.

The material of the body 12 is not limited to the resin material but may be a metal material.

One end of an engaging member 33 is inserted by a predetermined length into the opening 20 of the body 12. An expanded section 34 is formed at the one end of the engaging member 33, and is expanded radially outwardly. The expanded section 34 is engaged with an annular groove 35 on the inner circumferential surface of the body 12. Therefore, the engaging member 33 is prevented from disengagement from the body 12, and the engaging member 33 is connected to the body 12.

A tapered surface 36 is formed on the inner circumference of the expanded section 34 of the engaging member 33, and has diameters gradually expanded toward the other end of the engaging member 33.

A fastening section 37 is formed at the other end of the engaging member 33 for abutting against the end surface of the opening 20 of the body 12 and protrudes by a predetermined length radially outwardly.

A guide section 44 is formed at the other end of the engaging member 33, and protrudes radially inwardly.

A part of a release bush (releasing member) 38 is inserted displaceably in the axial direction into the engaging member 33. An end 40 of the release bush 38 is expanded radially outwardly by a predetermined length and has diameters gradually reduced toward the tip thereof. A plurality of unillustrated slits are formed while being spaced from each other by predetermined angles at the end 40 of the release bush 38.

A flange section 42 is formed at the other end of the release bush 38, and protrudes radially outwardly,.

The release bush 38 has an outer circumferential surface 43 which is supported displaceably in the axial direction by an inner circumferential surface 45 of the guide section 44. The release bush 38 has an inner circumferential diameter (designated by reference symbol A shown in FIGS. 1 and 8) which is slightly larger than an outer circumferential diameter (designated by reference symbol B in FIG. 8) of the fluid tube 18 to be inserted thereinto (A>B).

A chuck (retaining mechanism) 46 is formed by means of press working with a thin plate-shaped member. One end of the chuck 46 is installed between the inner circumferential surface 51 of the engaging member 33 and the outer circumferential surface 43 of the release bush 38.

An engaging section 48 is formed at one end of the chuck 46, and is bent to have a U-shaped cross section. The inner circumferential surface of the engaging section 48 is slidable along the outer circumferential surface 43 of the release bush 38. A stepped section 50 is formed between the end 40 of the release bush 38 and the outer circumferential surface 43 of the release bush 38. The end of the engaging section 48 is engaged with the stepped section 50 when the chuck 46 is displaced in the axial direction. Accordingly, the release bush 38 is prevented from disengagement from the body 12.

The chuck 46 extends from the engaging section 48 in a direction toward the connecting section 14 while contacting the inner circumferential surface 51 of the engaging member 33. The chuck 46 has an inclined section 52 and a diametrally expanded section 54. The inclined section 52 has diameters gradually expanded radially outwardly in the tightening section 16. The diametrally expanded section 54 extends substantially in parallel to the inner circumferential surface of the tightening section 19 of the body 12. A clearance is provided between the outer circumferential surface of the diametrally expanded section 54 and the inner circumferential surface of the second step section 26 of the body 12.

Figure 4:
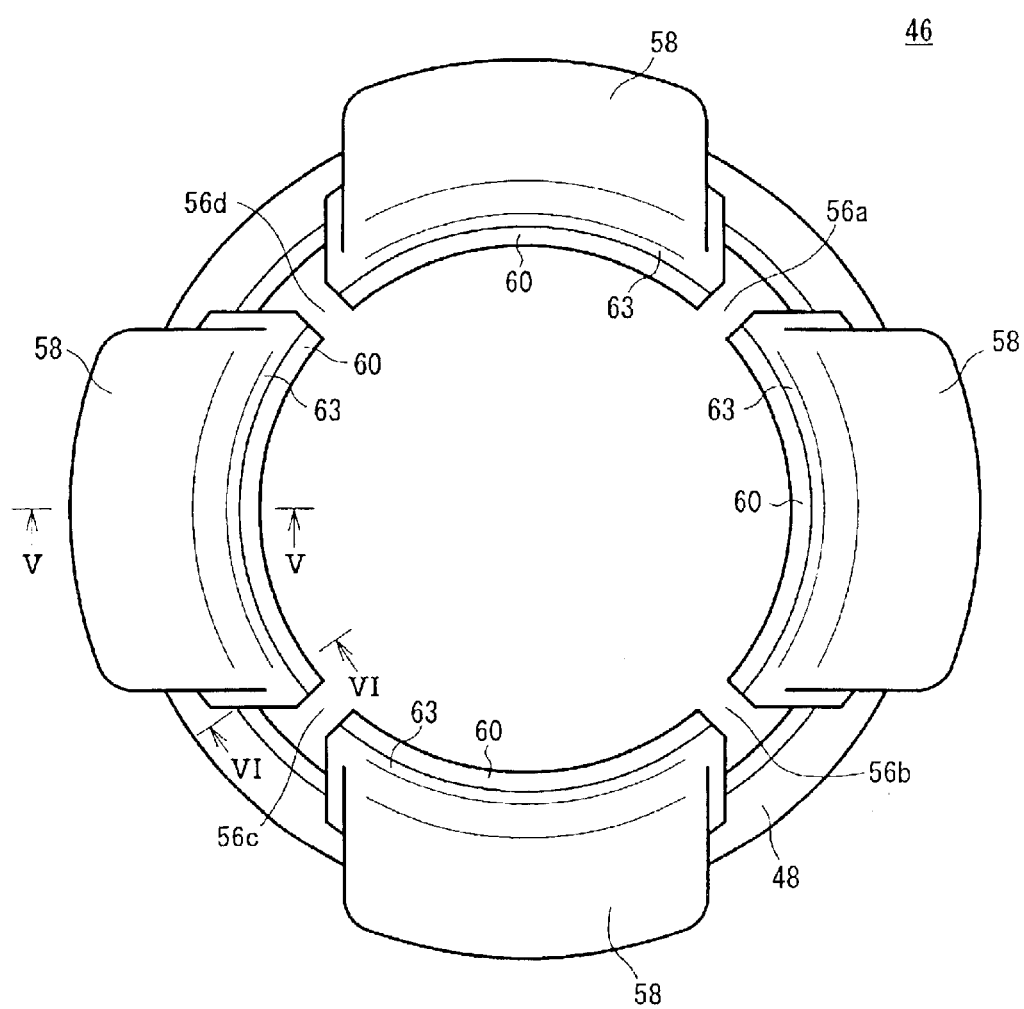
FIG. 4 is a view as observed in a direction of the arrow F shown in FIG. 3.

A plurality of slits 56a to 56d are formed at the other end of the chuck 46, and are spaced from each other by predetermined angles in the circumferential direction (see FIG. 4). On the other end of the chuck 46, there are also provided flat surface sections 58 each of which is bent substantially perpendicularly to the diametrally expanded section 54 toward the inner circumference, fastening pawls 60 each of which protrudes at an end of the flat surface section 58 on the inner circumferential side while being inclined by a predetermined angle in a direction toward the connecting section 14, curved sections 62 each of which is formed in the vicinity of the fastening pawl 60 and each of which is depressed by a predetermined length in a direction toward the opening 20 between the fastening pawl 60 and the flat surface section 58, and recesses (stopper mechanism) 63 each of which is formed by the curved section 62.

Figure 3:
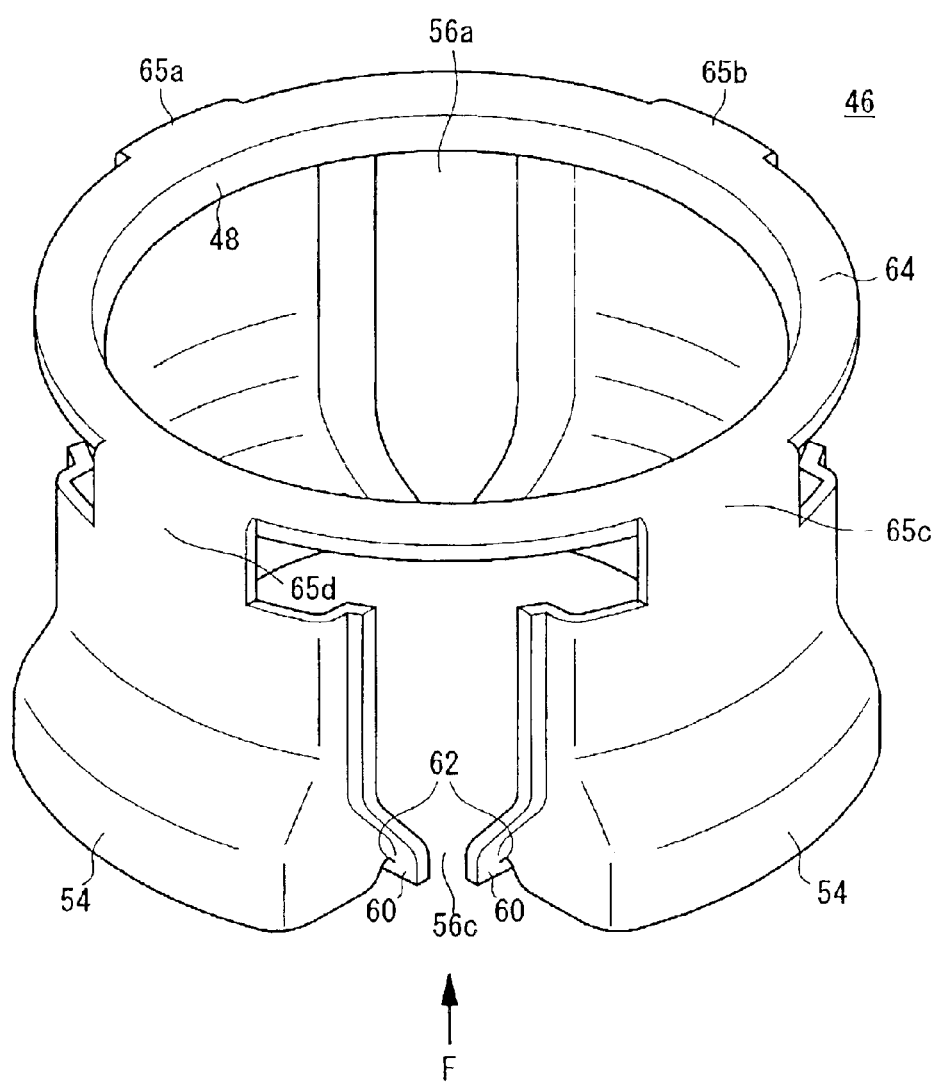
FIG. 3 is a perspective view illustrating a chuck of the tube joint.

As shown in FIG. 3, the fastening pawls 60 of the chuck 46 are formed diametrally expandable and diametrally reducible elastically by four support sections 65a to 65d which extend from an annularly formed ring section 64 while being spaced from each other by predetermined distances in the circumferential direction.

Figure 5:
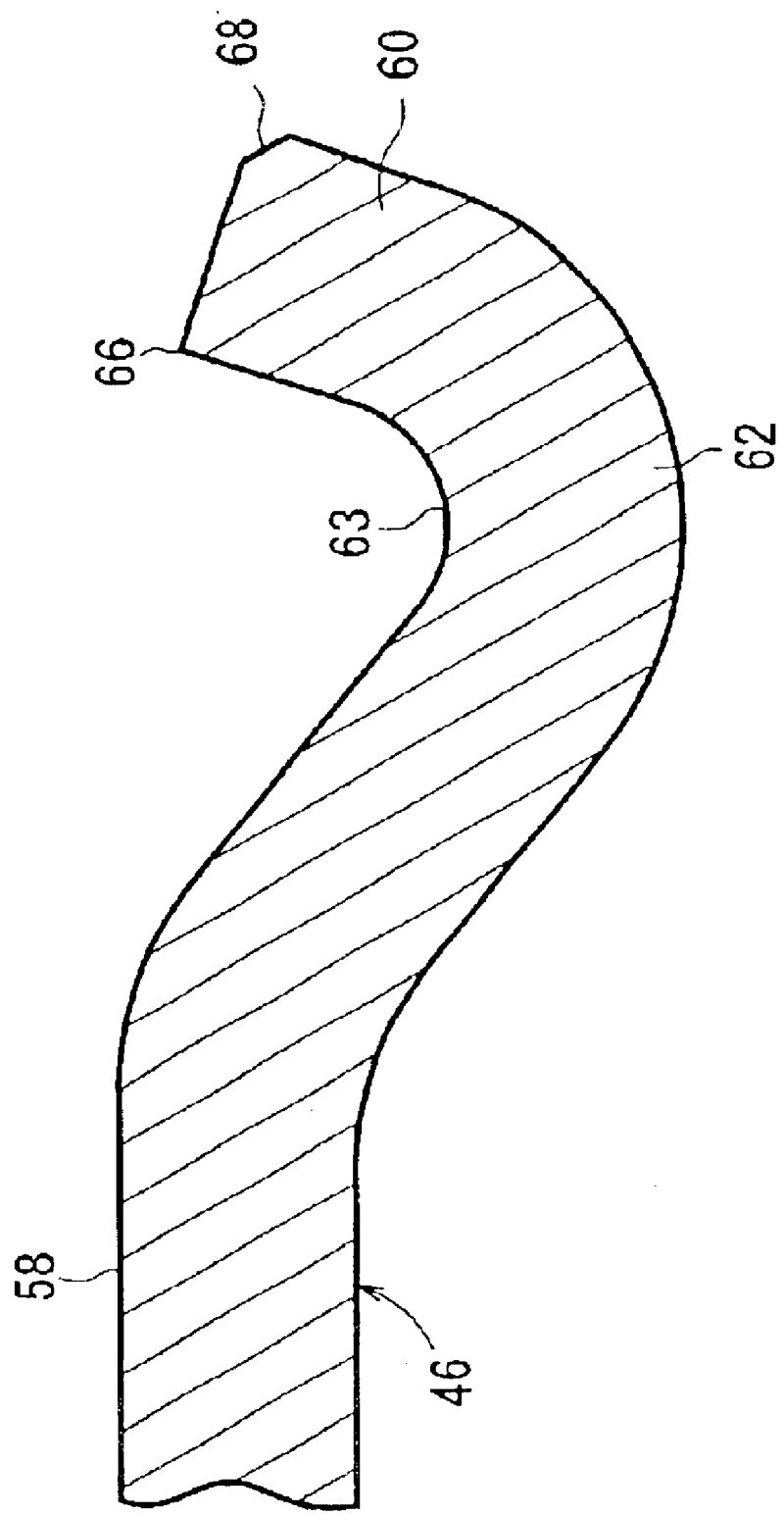
FIG. 5 is a partial magnified longitudinal sectional view taken along a line V—V shown in FIG. 4.
Figure 6:
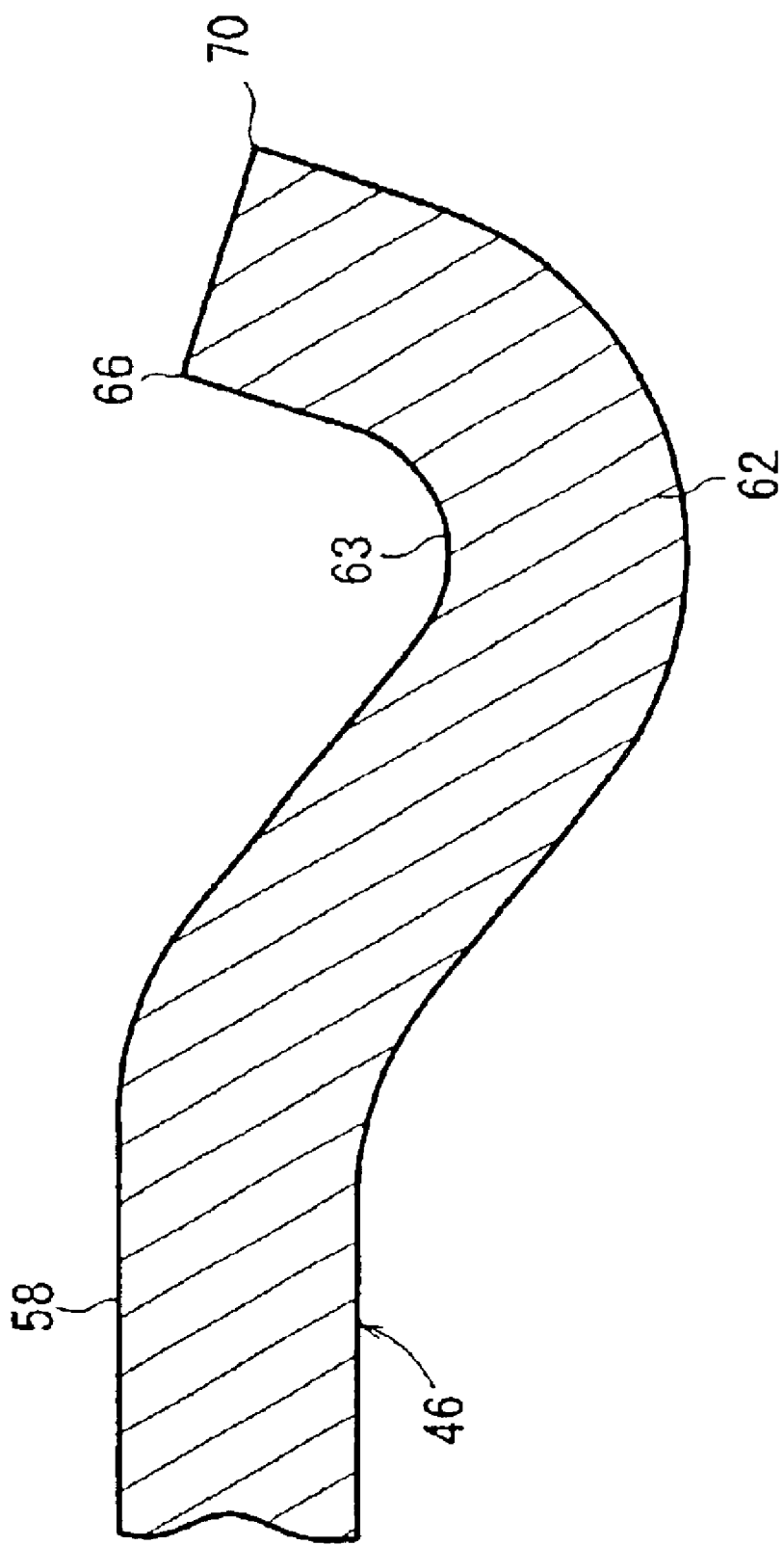
FIG. 6 is a partial magnified longitudinal sectional view taken along a line VI—VI shown in FIG. 4.

As shown in FIGS. 5 and 6, the end of the fastening pawl 60 is formed so that the recess 63 disposed on the inner circumference has a substantially orthogonal shape. As to the shape of the fastening pawl 60, portions at both sides near the slits 56a to 56d in the circumferential direction of the fastening pawl 60 are different from a substantially central portion in the circumferential direction of the fastening pawl 60 (see FIG. 5).

Specifically, a substantially orthogonal blade 66 is formed at one edge near the recess 63. As shown in FIG. 5, a chamfered section 68 is formed at the substantially central portion in the circumferential direction of the fastening pawl 60, at the other edge facing the fluid tube 18. As shown in FIG. 6, orthogonal sections 70 each having a substantially orthogonal cross section are formed on both edges in the vicinity of the slits 56a to 56d of the fastening pawls 56a to 56d (see FIG. 4).

The blade 66 bites into the outer circumferential surface of the fluid tube 18 when the fluid tube 18 is pulled.

That is, the chamfered section 68 and the orthogonal sections 70, which have the cross-sectional shapes different from each other, are provided at the portions of the fastening pawl 60 facing the fluid tube 18. Accordingly, the orthogonal sections 70 acutely bite into the outer circumferential surface of the fluid tube 18, and the chamfered section 68 is pressed against the outer circumferential surface of the fluid tube 18. Thus, the chamfered section 68 functions as resistance when the orthogonal sections 70 bite into the fluid tube 18.

As a result, the biting amount into the outer circumferential surface of the fluid tube 18 is limited since the fastening pawl 60 is provided with the chamfered section 68. The biting amount into the outer circumferential surface of the fluid tube 18 can be adjusted by changing the length of the chamfered section 68 to extend in the circumferential direction or the surface area of the chamfered section 68.

The fastening pawl 60 is formed to slightly protrude radially inwardly as compared with the inner circumferential surface of the release bush 38.

A clearance is provided between the outer circumferential surface of the diametrally expanded section 54 and the inner circumferential surface of the second step section 26 of the body 12.

The tube joint 10 according to the first embodiment of the present invention is basically constructed as described above. Next, its operation, function, and effect will be explained.

Figure 8:
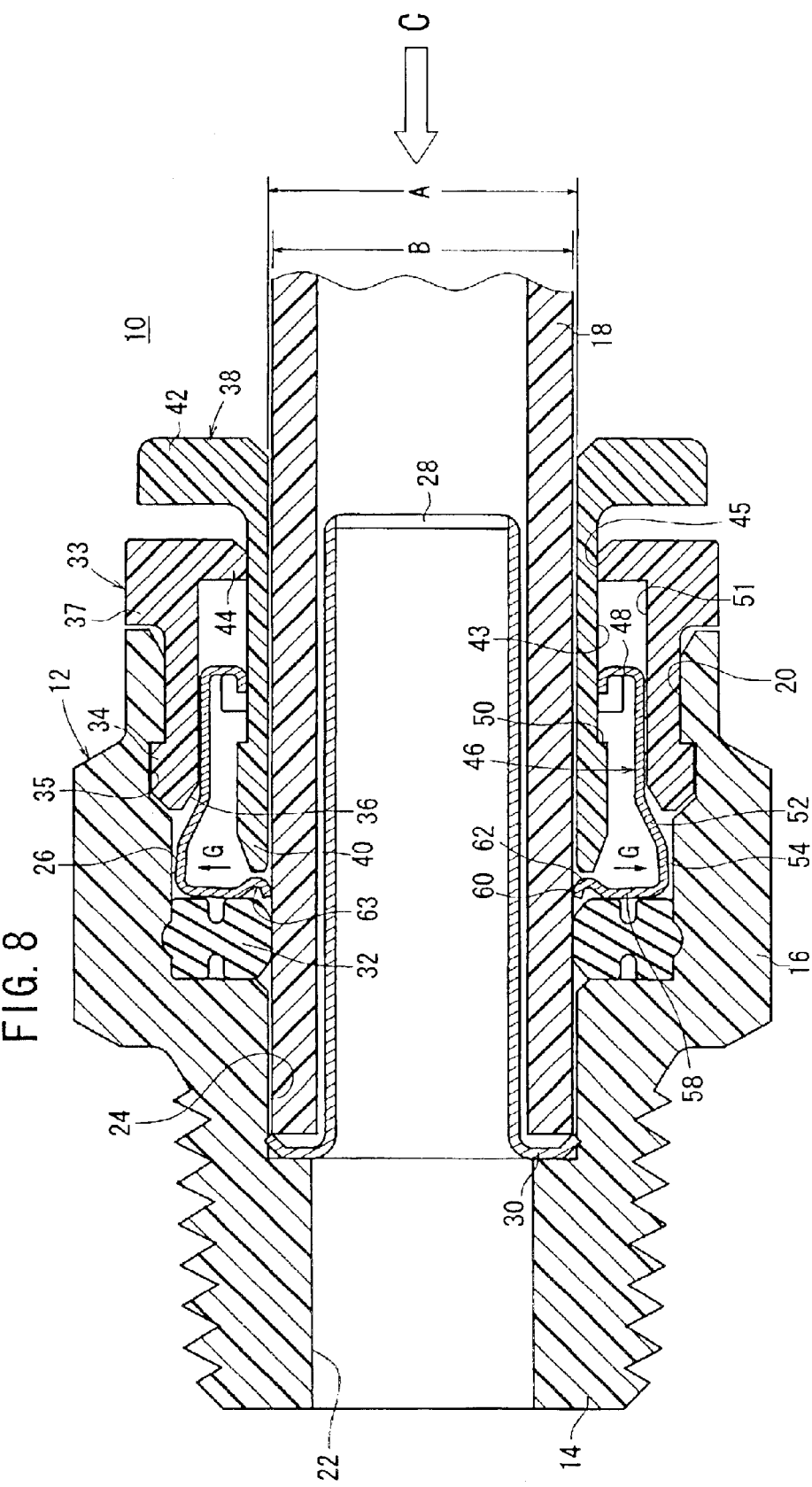
FIG. 8 is a longitudinal sectional view in which a fluid tube is inserted into the tube joint.
Figure 9:
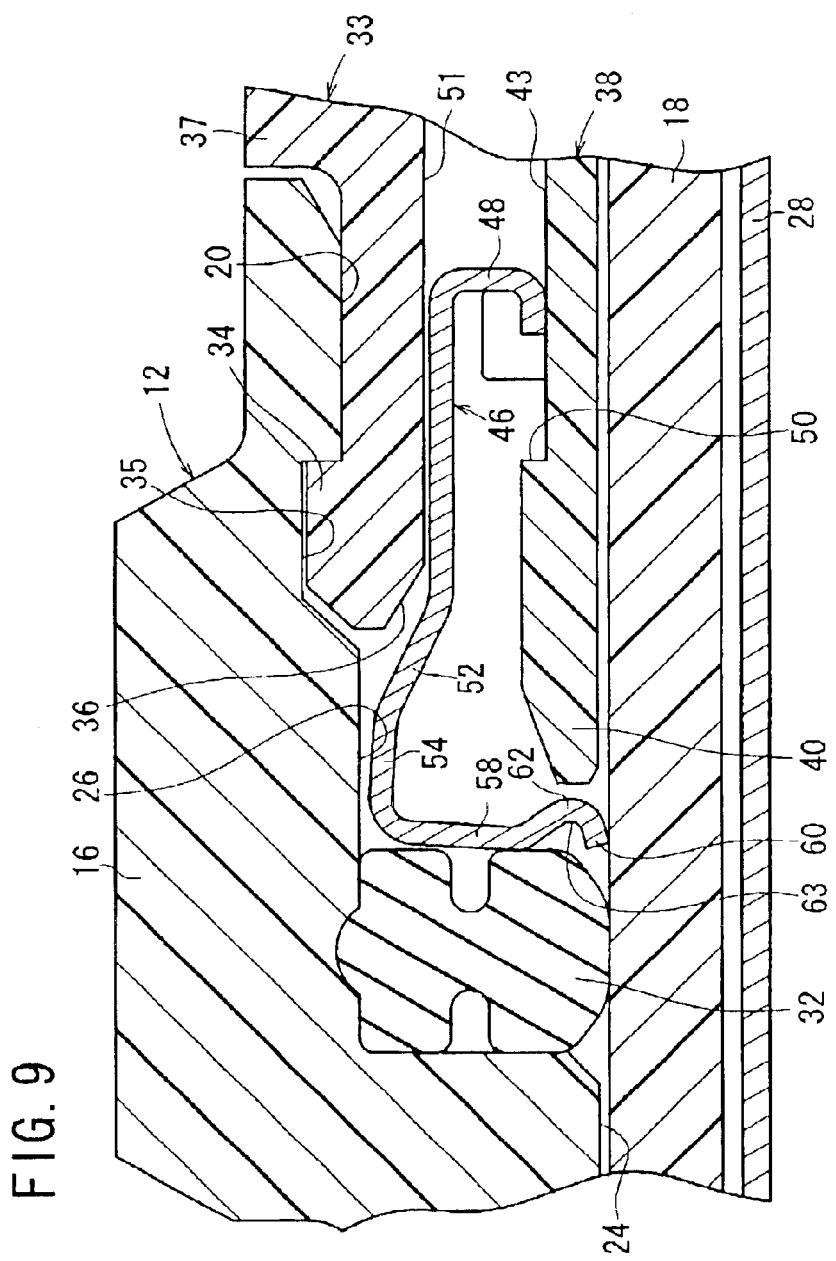
FIG. 9 is a partial magnified longitudinal sectional view illustrating the fastening pawl shown in FIG. 8 and the vicinity thereof.

Starting from a state in which the fluid tube 18 is not attached to the tube joint 10 as shown in FIG. 1, the fluid tube 18, which is connected to an unillustrated fluid-operated apparatus or the like, is inserted in the direction of the arrow C along the sleeve 28 as shown in FIG. 8 until one end surface of the fluid tube 18 abuts against the flange section 30 of the sleeve 28. In this situation, the inner circumferential surface of the packing 32 contacts the outer circumferential surface of the fluid tube 18 to surround the fluid tube 18. Accordingly, the air-tightness is retained for the fluid in the body 12, and the fluid flowing through the passage 22 is prevented from leakage to the outside.

Simultaneously, the other end of the chuck 46 is pushed and expanded radially outwardly (in the directions of the arrow G shown in FIG. 8) by the outer circumferential surface of the fluid tube 18. Therefore, the diametrally expanded sections 54 are displaced in the second step section 26, and the fastening pawls 60 contact the outer circumferential surface of the fluid tube 18 (see FIG. 9).

Figure 10:
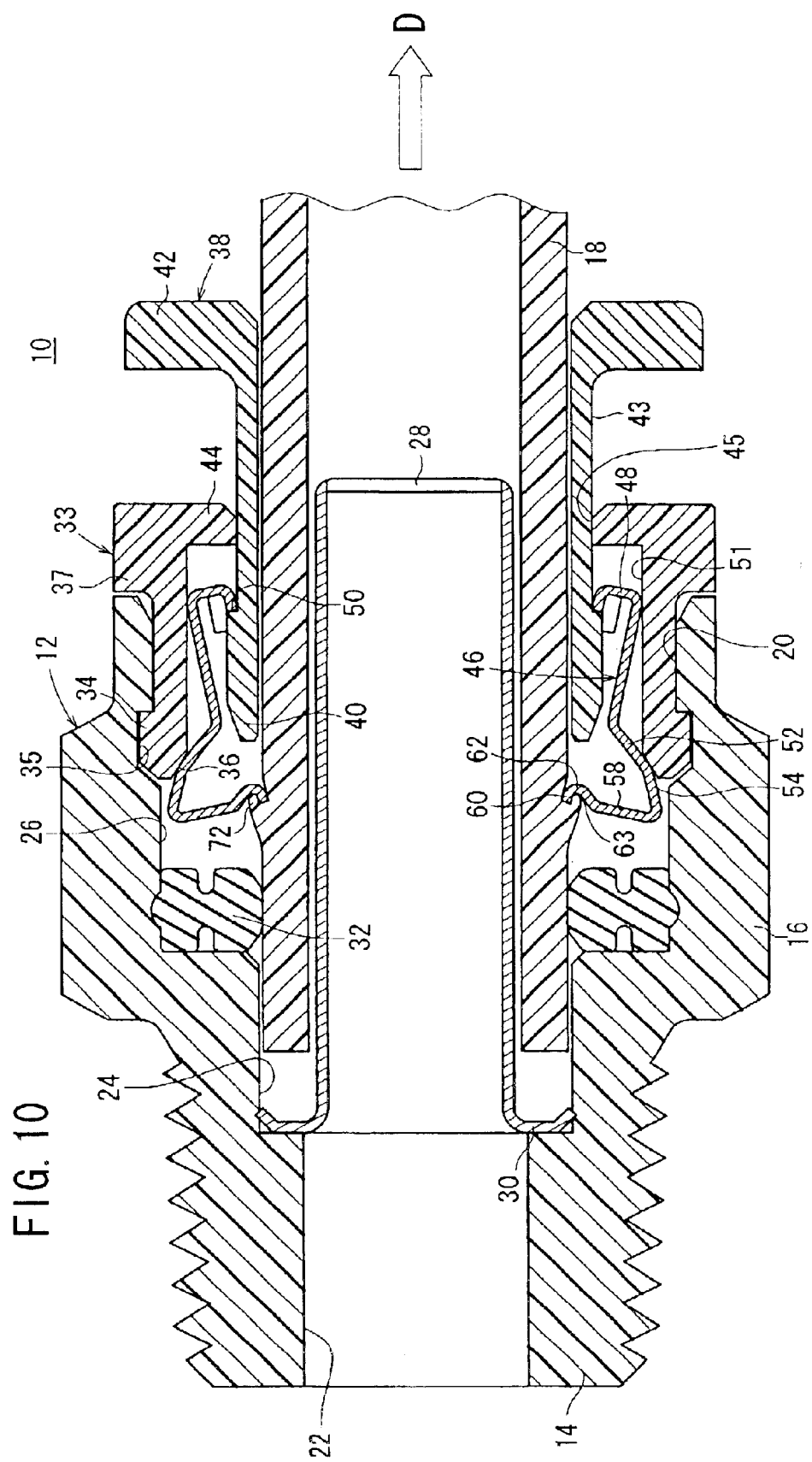
FIG. 10 is a longitudinal sectional view in which the fluid tube is fastened by the tube joint.
Figure 11:
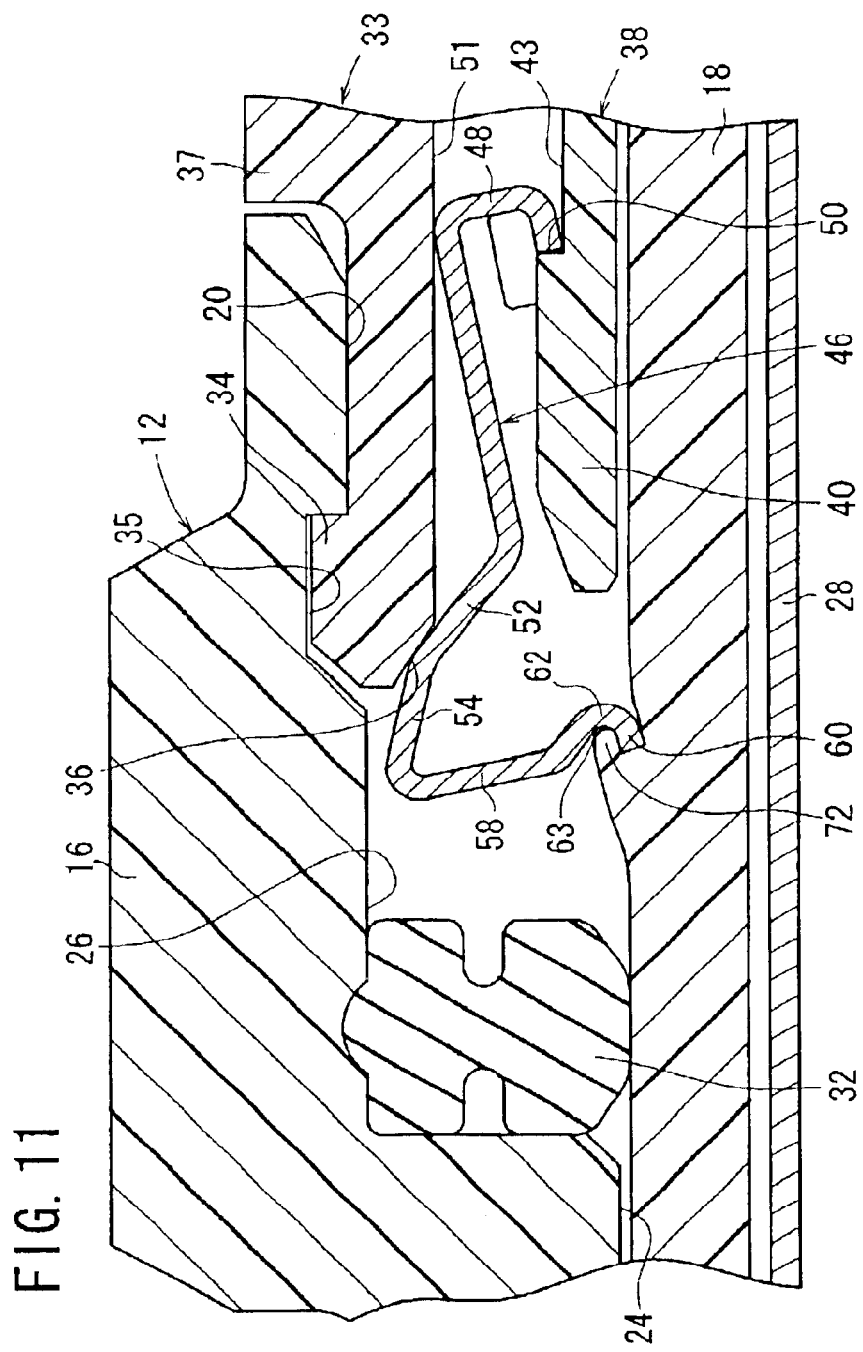
FIG. 11 is a partial magnified longitudinal sectional view illustrating the fastening pawl shown in FIG. 10 and the vicinity thereof.

As shown in FIG. 10, when the fluid tube 18 is slightly pulled in the direction toward the flange section 42 of the release bush 38 (in the direction of the arrow D) after the fluid tube 18 is inserted into the release bush 38, the fastening pawls 60 abutting against the outer circumferential surface of the fluid tube 18 bite into the outer circumferential surface of the fluid tube 18 under the pulling action exerted on the fluid tube 18 (see FIG. 11).

As shown in FIG. 11, the portion 72 located in the vicinity of the outer circumferential surface of the fluid tube 18 enters the recesses 63 substantially simultaneously along the upper surfaces of the fastening pawls 60 by the fastening pawls 60. As a result, the fluid tube 18 is reliably fastened by the fastening pawls 60 by biting into the outer circumferential surface and the portion 72 entering the recesses 63.

Further, as shown in FIG. 10, when it is intended to pull the fluid tube 18 in the direction toward the flange section 42 of the release bush 38 (in the direction of the arrow D), the portion 72, which has entered the recesses 63, functions as resistance against the displacement of the fluid tube 18 in the axial direction. Accordingly, the fluid tube 18 is reliably fastened, and the fluid tube 18 is prevented from disengagement from the tube joint 10. Further, the fastening pawls 60 are prohibited from further biting into the fluid tube 18.

That is, when the portion 72 located in the vicinity of the outer circumferential surface of the fluid tube 18 is advanced along the recesses 63, the recesses 63 behave as walls to function as stoppers. Accordingly, the biting amount of the fastening pawl 60 into the fluid tube 18 is limited. The proper biting amount of the fastening pawl 60 into the fluid tube 18 can be set by changing, for example, the angle of inclination of the fastening pawl 60, the position of the recess 63 in the radial direction and in the axial direction, and the depressing amount of the recess 63.

When the fastening pawl 60 bites into the outer circumferential surface of the fluid tube 18, the portion 72 located in the vicinity of the outer circumferential surface of the fluid tube 18 enters the recess 63 along the upper surface of the fastening pawl 60. Accordingly, it is possible to avoid any release of the portion 72 located in the vicinity of the outer circumferential surface of the fluid tube 18, which would be caused in the direction to separate from the side surface on the side of the recess 63 of the fastening pawl 60.

Figure 12:
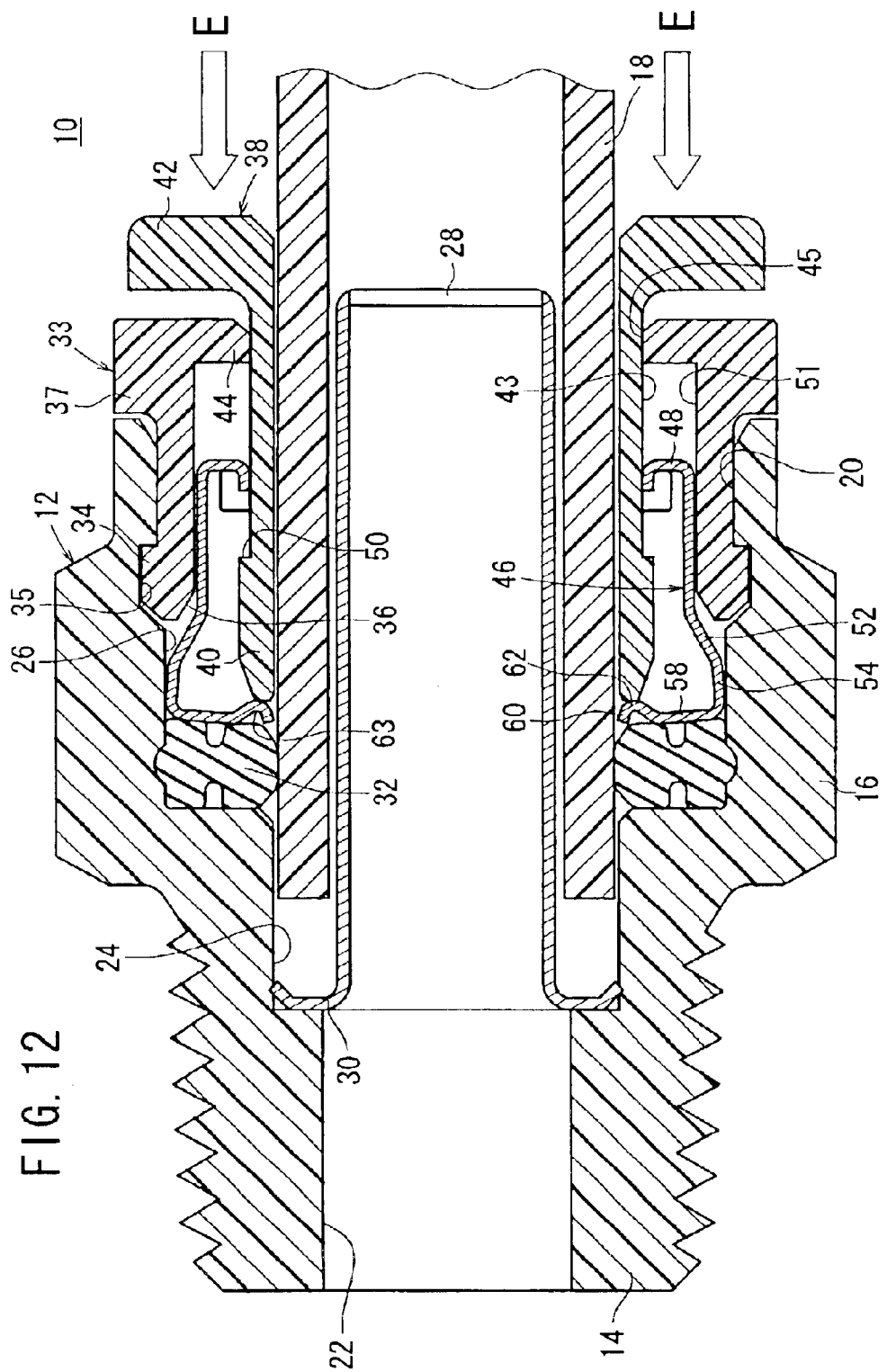
FIG. 12 is a longitudinal sectional view in which the fluid tube is released from the tube joint.
Figure 13:
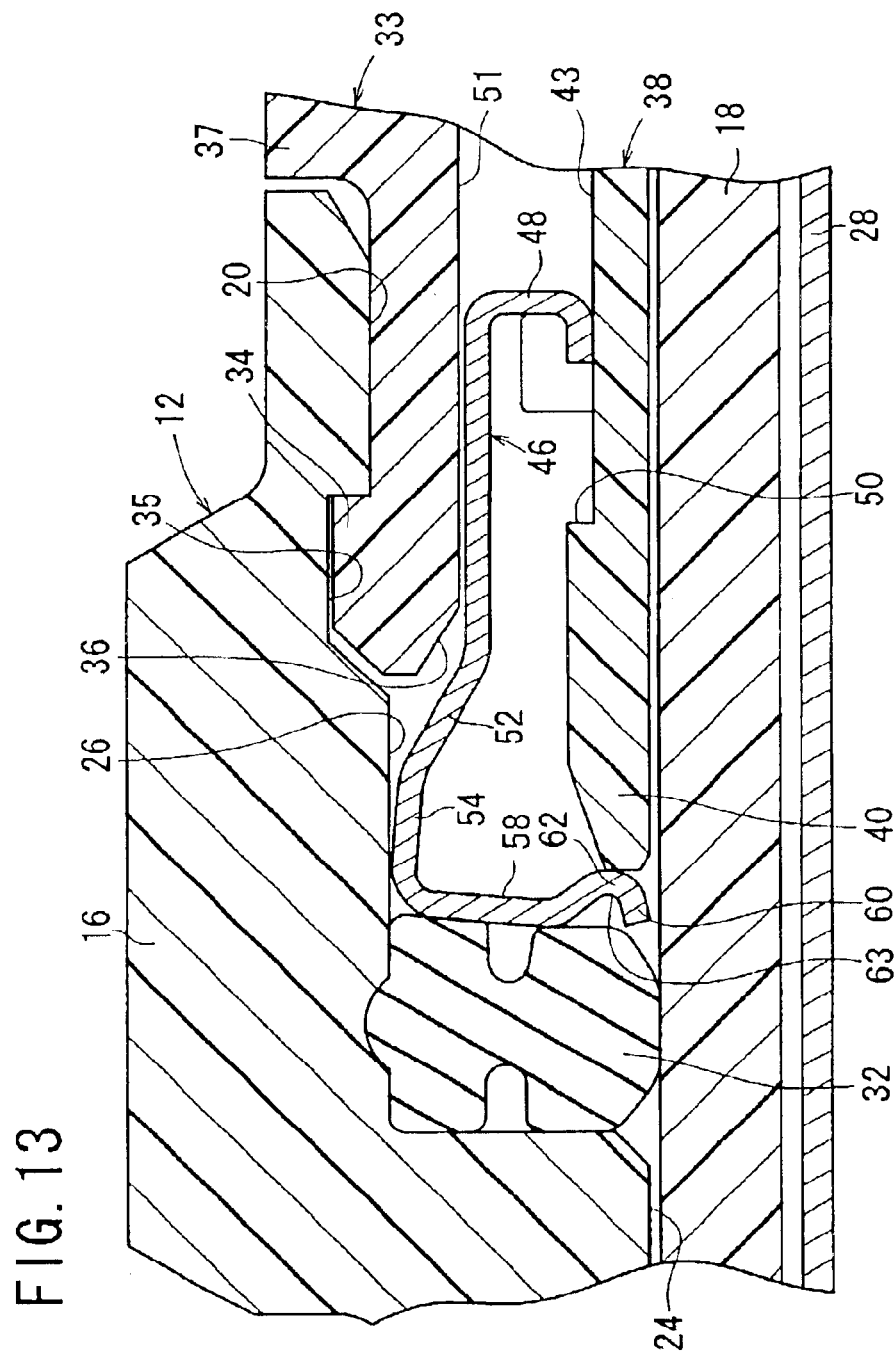
FIG. 13 is a partial magnified longitudinal sectional view illustrating the fastening pawl shown in FIG. 12 and the vicinity thereof.

Finally, when the fluid tube 18 is released from the tube joint 10, the flange section 42 of the release bush 38 is pushed in the direction toward the connecting section 14 (in the direction of the arrow E) as shown in FIG. 12. The end 40 of the release bush 38 presses the side surfaces of the curved sections 62 by pressing the flange section 42 (see FIG. 13). The recesses 63 are displaced together with the curved sections 62 in the direction toward the packing 32 (in the direction of the arrow E) by being pressed by the end 40. The other end of the chuck 46 is forcibly displaced radially outwardly. Accordingly, the fastening pawls 60 biting into the outer circumferential surface of the fluid tube 18 are separated from the outer circumferential surface of the fluid tube 18.

As a result, the fluid tube 18 is released from the fastened state in the axial direction. Therefore, the fluid tube 18 can be disengaged from the tube joint 10 by pulling the fluid tube 18 in the axial direction.

As described above, in the first embodiment, the tube joint 10 is provided with the fastening pawls 60 which protrude on the inner circumference of the chuck 46, and the recesses 63 which are disposed in the vicinity of the fastening pawls 60. Accordingly, when the fluid tube 18 is pulled, the portion 72 located in the vicinity of the outer circumference of the fluid tube 18 enters the recesses 63, and the further advance is limited by the inner wall surfaces of the recesses 63. As a result, it is possible to suppress the biting amount of the fastening pawl 60 into the fluid tube 18. Therefore, it is possible to always maintain the stable retaining state for the tube joint 10.

Further, the tube joint 10 is provided with the chuck 46 which is disposed between the engaging member 33 and the release bush 38 for both of the function to fasten the fluid tube 18 and the function to be retained in the engaging member 33. Accordingly, the guide member and the fastening member, which have been hitherto provided, can be constructed as one part. Therefore, it is possible to reduce the number of parts, and it is possible to improve the assembling operability of the tube joint 10.

Next, a fastening pawl 80 according to a modified embodiment will be explained.

Figure 7:
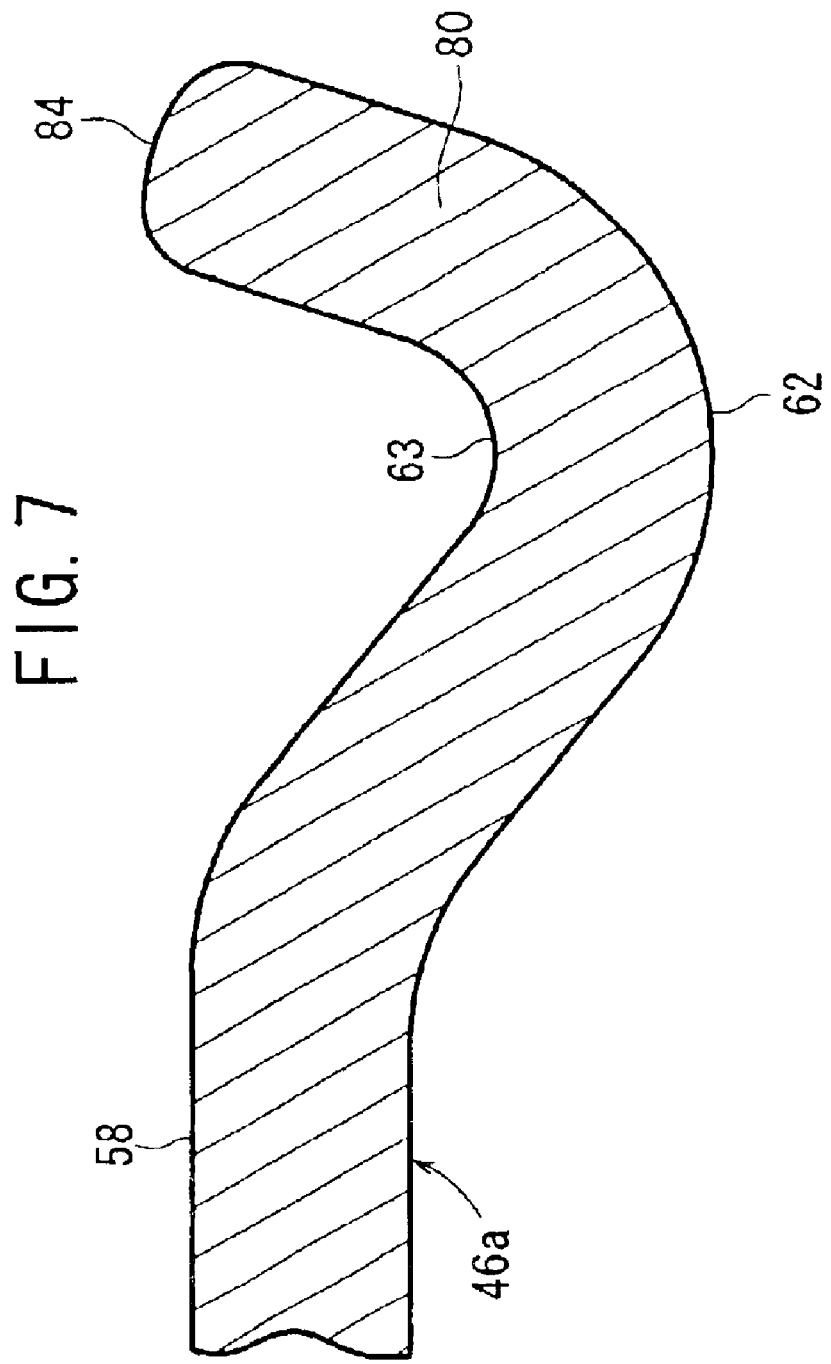
FIG. 7 is a partial magnified longitudinal sectional view illustrating a fastening pawl according to a modified embodiment.

As shown in FIG. 7, the fastening pawl 80 has an end 84 having a circular arc-shaped cross section.

The fastening pawl 80 is not provided with the chamfered section 68 unlike the fastening pawl 60 of the first embodiment.

The circular arc-shaped end 84 bites into the outer circumferential surface of the fluid tube 18 when the fluid tube 18 is pulled and the circular arc-shaped end 84 is pressed against the outer circumferential surface of the fluid tube 18. Because of the form of the circular arc-shaped end 84, it is possible to suppress the biting amount of the fastening pawl 80 into the fluid tube 18. Therefore, it is possible to reliably retain the fluid tube 18 in the tube joint 10.

Figure 14:
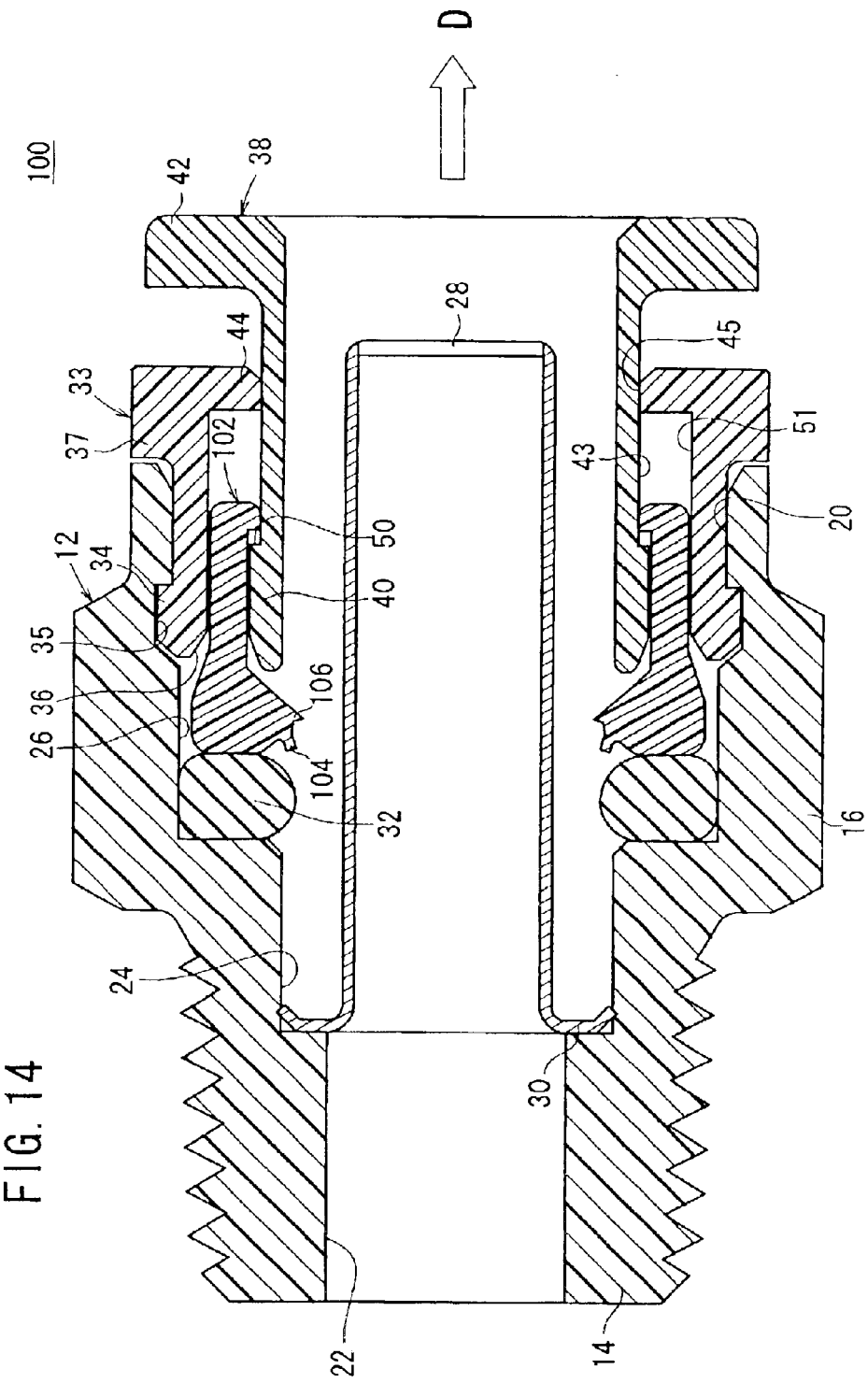
FIG. 14 is a longitudinal sectional view illustrating a tube joint according to a second embodiment of the present invention.

Next, a tube joint 100 according to a second embodiment of the present invention is shown in FIG. 14. In the following embodiments, the constituent components that are same as the components of the tube joint 10 according to the first embodiment are designated by the same reference numerals, detailed explanation of which will be omitted.

The tube joint 100 according to the second embodiment is different from the tube joint 10 according to the first embodiment in that a first fastening pawl 104 and a second fastening pawl 106, which protrude on the inner circumferential surface of a chuck 102 while being spaced from each other by a predetermined distance, are provided at two positions.

When the fluid tube 18 (see FIG. 8), which is inserted into the release bush 38, is pulled in the direction toward the flange section 42 of the release bush 38 (in the direction of the arrow D), both of the first fastening pawl 104 and the second fastening pawl 106 bite into the outer circumferential surface of the fluid tube 18. Therefore, it is possible to fasten the fluid tube 18 more strongly.

Figure 15:
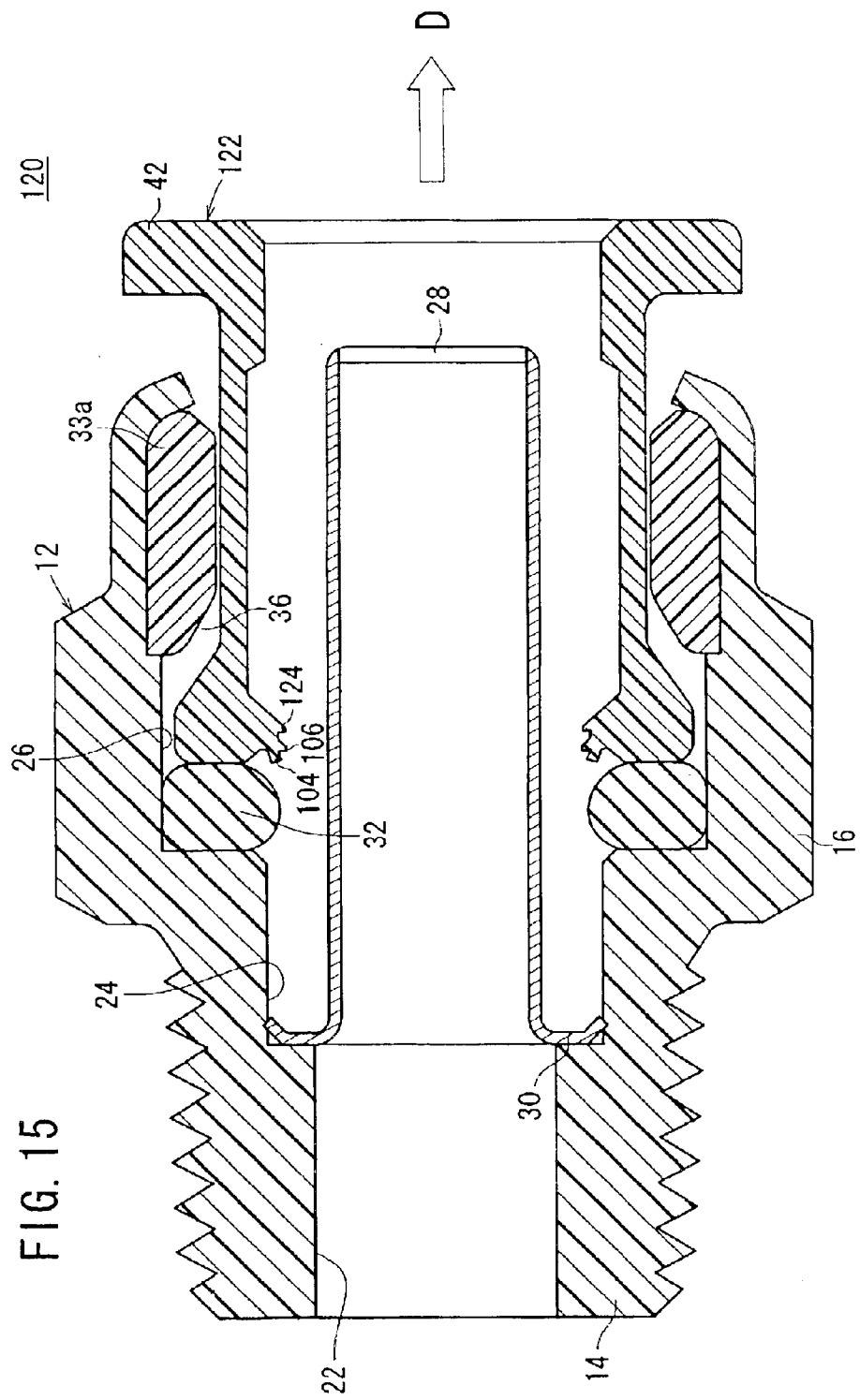
FIG. 15 is a longitudinal sectional view illustrating a tube joint according to a third embodiment of the present invention.

Next, a tube joint 120 according to a third embodiment of the present invention is shown in FIG. 15.

The tube joint 120 according to the third embodiment is different from the tube joint 10 according to the first embodiment in that an attachment/detachment member 122, in which the chuck 46 and the release bush 38 of the tube joint 10 according to the present invention are integrally formed, is provided on the inner circumferential side of an engaging member 33a, and first to third fastening pawls 104, 106, 124, which protrude on the inner circumferential surface of the attachment/detachment member 122, are provided at three positions.

In this embodiment, it is possible to reduce the number of parts by integrally forming the chuck 46 and the release bush 38. When the fluid tube 18 (see FIG. 8), which is inserted into the release bush 38, is pulled in the direction toward the flange section 42 of the release bush 38 (in the direction of the arrow D), the first to third fastening pawls 104, 106, 124 bite into the outer circumferential surface of the fluid tube 18 respectively. Therefore, it is possible to fasten the fluid tube 18 much more strongly.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A tube joint comprising:
    a body into which a fluid tube is inserted;
    a retaining mechanism which is arranged in said body and which retains said fluid tube by a fastening pawl, said fastening pawl biting into an outer circumferential surface of said fluid tube; and
    a stopper mechanism which is provided for said retaining mechanism and which limits a biting amount of said fastening pawl into said fluid tube, said stopper mechanism comprising a recess which extends along an outer circumference of said fluid tube and which is formed in a curved form in the vicinity of said fastening pawl,
    wherein, when said fastening pawl bites into the outer circumferential surface of said fluid tube, a portion of said fluid tube in a vicinity of said outer circumference of said fluid tube enters into said recess and abuts against an inner wall surface of said recess.

2. The tube joint according to claim 1, further comprising a releasing member which is arranged in said body for releasing said fluid tube from said retaining mechanism.

3. The tube joint according to claim 2, wherein said releasing member is pressed toward said body to press said retaining mechanism for retaining said fluid tube, and thus said fastening pawl is displaced radially outwardly.

4. The tube joint according to claim 1, wherein said retaining mechanism has an inclined section which has diameters gradually reduced in a direction in which said fluid tube is inserted.

5. The tube joint according to claim 4, wherein said inclined section abuts against a tapered surface of an engaging member attached to said body when said fluid tube is pulled in a direction to separate from said body.

6. The tube joint according to claim 2, wherein said retaining mechanism is formed integrally with said releasing member for releasing said fluid tube from said fastening pawl.

7. The tube joint according to claim 1, wherein said stopper mechanism includes a chamfered section which extends along an outer circumference of said fluid tube and which is formed on said fastening pawl facing said fluid tube.

8. The tube joint according to claim 1, wherein said fastening pawl is formed at an end of a curved section which extends along an outer circumference of said fluid tube.

9. The tube joint according to claim 1, wherein a plurality of said fastening pawls are provided along outer circumference of said fluid tube while being spaced from each other by predetermined distances with slits interposing therebetween.

10. The tube joint according to claim 9, wherein said plurality of said fastening pawls are spaced from each other by predetermined distances in an axial direction of said body.

11. The tube joint according to claim 1, wherein said fastening pawl has an end having a circular arc-shaped cross section.

12. The tube joint according to claim 1, wherein a maximum width of said recess, between said fastening pawl and a flat surface section of said retaining mechanism, is less than a wall width of said fluid tube, so that no more than said portion of said fluid tube enters into said recess.

* * * * *